(12) United States Patent
Slezak

(10) Patent No.: US 6,356,407 B1
(45) Date of Patent: Mar. 12, 2002

(54) SYSTEM AND PROCESS FOR REDUCING CONTAMINATION IN INTERNAL DISC DRIVE ENVIRONMENT

(75) Inventor: Arnold George Slezak, Yukon, OK (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/282,334

(22) Filed: Mar. 31, 1999

(51) Int. Cl.[7] ............................................... G11B 33/14
(52) U.S. Cl. ..................................................... 360/97.02
(58) Field of Search ............................ 360/97.01, 97.02

(56) References Cited

U.S. PATENT DOCUMENTS

| | | | | |
|---|---|---|---|---|
| 4,830,643 A | * | 5/1989 | Sassa et al. .................... 55/316 |
| 5,715,116 A | * | 2/1998 | Moritan et al. ........... 360/99.08 |
| 5,876,487 A | * | 3/1999 | Dahlgren et al. ............... 96/13 |
| 6,128,159 A | * | 10/2000 | Ino .......................... 360/97.02 |

* cited by examiner

Primary Examiner—George J. Letscher
(74) Attorney, Agent, or Firm—Merchant & Gould, P.C.

(57) ABSTRACT

A data storage system includes a housing which defines an interior environment. At least one data storage disc is disposed within the housing interior. At least one head is supported adjacent the data storage disc within the housing interior. In addition, the rotor of a disc motor is disposed within the housing interior, wherein the rotor has a capability of outgassing vaporized contaminant within the housing interior environment. A receptacle is located within the housing interior, in air-flow communication with the disc motor rotor. A packet containing contaminant absorbent and/or absorbent material disposed within the receptacle. The packet includes an outer skin of porous material and contains an activated carbon material capable of absorbing vaporized motor oil.

3 Claims, 2 Drawing Sheets

SYSTEM AND PROCESS FOR REDUCING CONTAMINATION IN INTERNAL DISC DRIVE ENVIRONMENT

BACKGROUND OF THE INVENTION

1. Field of the Invention

This invention relates generally to a data storage system, apparatus and processes of making and using the same, and in particular embodiments to a system, apparatus, and processes for reducing contamination at the head-disc interface of a disc drive apparatus.

2. Description of Related Art

Modern computers employ various forms of storage systems for storing programs and data. For example, various forms of disc drive systems have been designed to operate under the control of a computer to record information and/or retrieve recorded information on one or more recording discs. Such disc drives include hard disc drives which employ recording discs that have magnetizable (hard) recording material, optical disc drives which employ recording discs that have optically readable recording material, magneto-optical (MO) disc drives which employ recording discs that have optically readable magnetizable recording material, or the like.

Conventional disc drive systems typically include one or more recording discs supported for relatively high speed rotation on a rotary spindle hub. In systems employing more than one recording disc, the discs are typically arranged in a stack on the hub. The recording surfaces of such stacked discs are accessed by the read/write heads mounted on a complementary stack of actuator arms, which form a part of an actuator assembly. Typically, the actuator assembly has an actuator body that pivots about a pivot mechanism disposed in a medial portion thereof. A motor selectively positions a proximal end of the actuator body. This positioning of the proximal end in cooperation with the pivot mechanism causes a distal end of the actuator body, which supports the read/write heads, to move generally radially across the recording surfaces of the discs, such that the head may be selectively positioned adjacent any recording location on the recording surface, as the disc is rotated.

In a reading or recording operation, the heads are supported in close proximity to respective disc recording surfaces, while the discs are rotated with the spindle hub at several thousand rotations per minute (RPMs). The heads are moved in an array, in the generally radial direction of the disc surfaces, to align or register the heads with desired track locations on the disc surfaces. Once aligned or registered, the heads are operated to read or write information at desired track locations, while the disc (and, thus, the recording surface) spins at a relatively high rate.

The high rate of rotation of the discs produces a thin layer of air along each disc surface, moving at a high velocity in the direction of rotation of the disc surface. The layers of air, or air bearings, formed on the moving disc surfaces help support the heads in close proximities to, but slightly spaced from, the disc surfaces. However, when the disc rotation rate decreases, such as during power down, the air bearing effect decreases and the heads may be allowed to come into contact and rest against the disc surface. Typically, the heads are moved to a position adjacent designated portions of the discs suitable for contacting the heads, for example regions near the disc centers, before the air bearing effect decreases to a degree that allows head/disc contact. Once the disc rotation stops, the heads remain in contact with the respective disc surfaces until the next successful power up operation.

In such disc drive apparatuses, head stiction, or static friction between the head and disc surface, can inhibit the head and disc from breaking free of each other during power up and, thus, can result in a failure of the disc drive. Contaminants on the head and disc surfaces can increase the stiction effect and, thus, increase the likelihood of disc drive failure. For example, contaminants within the drive housing (such as those that outgas from the motor) tend to gather at the head-disc interface and cause the head and disc to stick together. In closed confines of a disc drive housing, contaminants tend to accumulate over time and can eventually exceed a failure threshold amount.

The degree of outgassing of oil from components of the disc drive motor depends, in part, on the type of motor used in the disc drive apparatus. For example, hydrodynamic motors of the type described in co-pending patent application Ser. No. 09/247,793, titled "Hydrodynamic Motor In A Head Disc Assembly," filed Mar. 1, 1999, which is assigned to the assignee of the present application, have a potential to expose a greater amount of oil to the environment than, for example, motors which employ sealed bearings. However, because of other advantages that are available with hydrodynamic motors, such motors are a preferred choice in various applications of use.

Thus, there is a need in the industry for a system, apparatus and process for minimizing drive failure by reducing the amount of contamination at the head-disc interface. There is a further need for such a system, apparatus and process which employs a hydrodynamic motor. In addition, there is a need for such systems, apparatuses and processes which are capable of being manufactured and implemented in a relatively simple and cost effective manner.

As discussed in more detail below, embodiments of the present invention address the above-noted needs by employing a porous sack containing a contaminant absorbent material. While porous sacks containing silica gel has been used in disc drive devices to absorb moisture, for humidity control, such silica gel sacks have been ineffective in absorbing contaminants, such as oils, other hydrocarbons and other contaminants which tend to accumulate within disc drive housings.

SUMMARY OF THE DISCLOSURE

Accordingly, one advantage of preferred embodiments of the present invention is to address the above-noted need by reducing contamination in the internal environment of the disc drive apparatus, to minimize the accumulation of contamination at the head-disc interface.

Another advantage of further preferred embodiments of the present invention is to address the above-noted need by providing an efficient, cost-effective article and process that is relatively easy to manufacture and implement, for reducing contamination in the internal environment of the disc drive housing.

A preferred embodiment of the present invention involves a data storage system and apparatus which includes a housing defining an internal environment in which other disc drive components are contained. During operation, contaminants within the housing tend become vaporized and transported around various components in the housing interior volume. Such contaminants have a vapor pressure and a chemical composition dependent on the contaminant. The amount of vaporized contaminant in the environment varies with different environmental factors, such as temperature.

Various disc drive components contained within the disc drive housing include, for example, data storage discs, heads, the rotor of a disc motor, the head array actuator and other components well known in the art. In preferred embodiments, the disc motor is a hydrodynamic motor of the type described in co-pending patent application Ser. No. 09/247,793 titled "Hydrodynamic Motor In A Head Disc Assembly," filed Feb. 8, 1999. As described above, various components, such as hydrodynamic disc motor components, can have a tendency of outgassing contaminants into the environment within the interior volume of the housing.

Accordingly, in preferred embodiments, a suitable material is selected as an absorbent or getter for the contaminant, and is disposed within the internal environment of the housing interior. A preferred contaminant absorbent or getter materials include activated carbon or activated carbon composition. However, other embodiments may employ other suitable contaminant absorbent or getter material, including, but not limited to Tenax (a trademark of Buchem B. V. Corporation). According to preferred embodiments, the material (such as activated carbon) is contained within a bag or packet made of a suitably porous material, including, but not limited to polytetrafluoroethylene (PTFE), or the like. The packet may be readily placed within the disk drive housing interior, during manufacture, with minimal manufacturing complexity. In further preferred embodiments, the packet is placed in a location within the housing interior having a relatively high exposure to air-flow within the interior. In yet further preferred embodiments, the housing interior is specifically configured to provide an internal location which is exposed to a sufficient degree of air-flow and which receives and holds the packet of material. The volume of absorbent or getter material is preferably selected based on (to be capable of absorbing) the volume of contaminant expected to be outgassed or otherwise present within the disc drive housing during normal operational life.

Various advantages and features of novelty which characterize the invention are pointed out with particularity in the claims annexed hereto and form a part hereof. However, for a better understanding of the invention and its advantages, reference should be made to the drawings which form a further part hereof, and to accompanying descriptive matter, in which there is illustrated and described specific examples in accordance with preferred embodiments of the invention.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description of preferred embodiments, reference is made to the accompanying drawings which form a part hereof, and in which is shown by way of illustration a specific embodiment in which the invention may be practiced. It is to be understood that other embodiments may be utilized and structural changes may be made without departing from the scope of the preferred embodiments of the present invention.

Preferred embodiments of the present invention relate to systems, processes, and apparatuses for reducing the level of contamination at a head-disc interface by providing one or more packets of absorbent or getter material at one or more competitive absorption and/or adsorption sites for gaseous contaminants and, in further preferred embodiments, by providing a disc drive housing interior with such absorption and/or adsorption site(s) or receptacle(s) having sufficient air flow characteristics to maximize the flow of airborne contaminants to such site(s) or receptacle(s).

Figure 1:
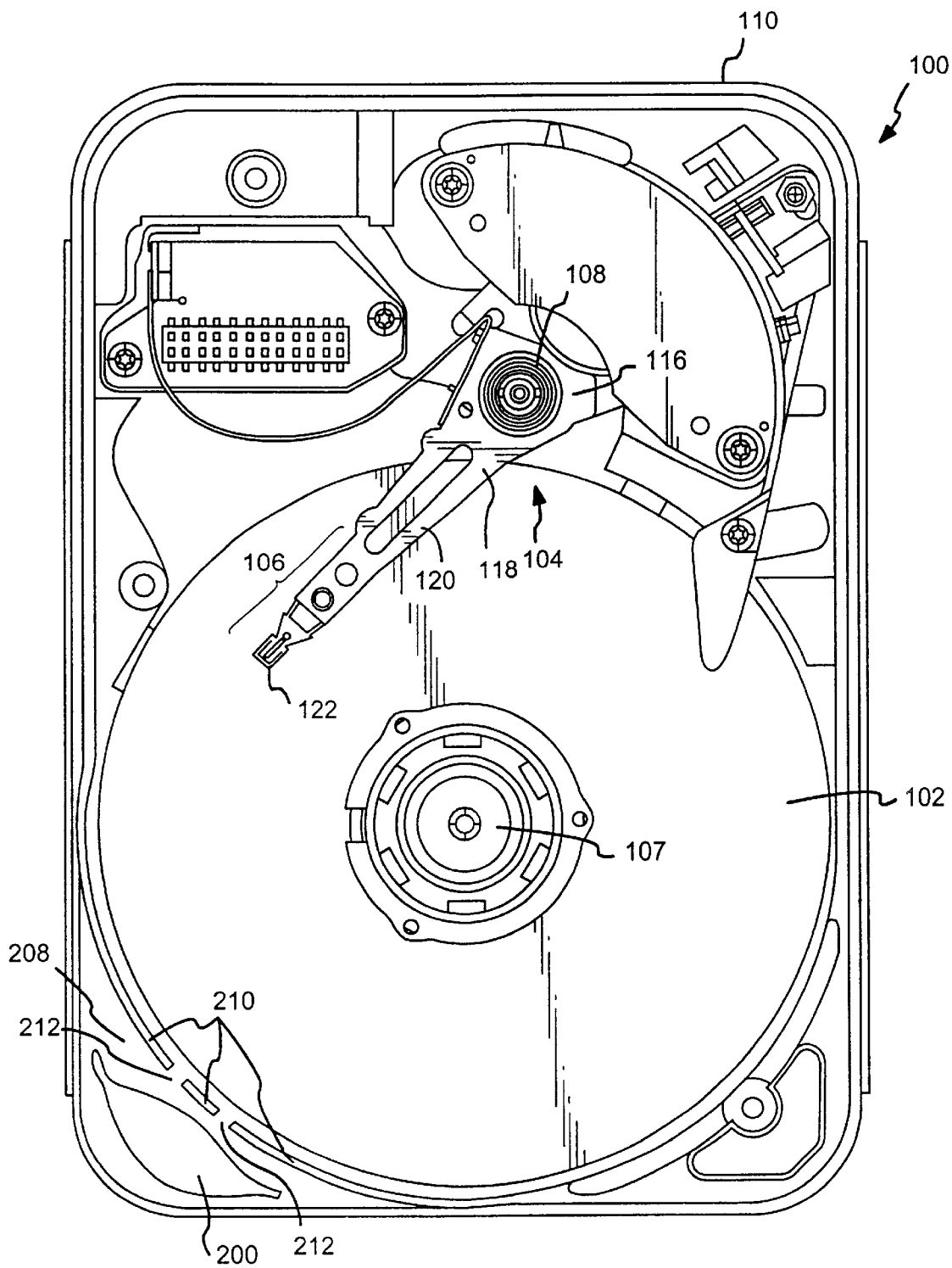
FIG. 1 illustrates an exemplary hard drive system and apparatus used to implement a preferred embodiment of the present invention.

FIG. 1 illustrates an exemplary hard disc drive system that could be used to implement embodiments of the present invention. However, those skilled in the art will recognize that the exemplary environment illustrated in FIG. 1 is not intended to limit the present invention. Indeed, those skilled in the art will recognize that other alternative hardware environments may be used without departing from the scope of the present invention.

In the FIG. 1 embodiment, a hard drive system 100 comprises a housing 110 and a number of components disposed within the housing. The housing 110 defines an enclosed interior compartment surrounded by housing side walls, a base and a top wall for containing further components of the system. For example, various disc drive components may be mounted on the base portion of the housing, while the top wall of the housing may serve to cover and seal components within the housing interior.

In preferred embodiments, the interior compartment within the housing walls is sealed to inhibit air-flow between the interior and exterior of the compartment. However, in further preferred embodiments, a vent opening is formed, for example, within the top wall and is preferably provided with a filter element, for allowing vaporized contaminants to escape the housing interior.

The disc drive components supported on the base of the housing interior include at least one storage media (or disc 102), and preferably a stack of plural storage media (or discs). The disc drive system 100 further includes an actuator assembly 104, a head assembly 106, and a spindle hub 107, located within the housing. The actuator assembly 104 is pivotally mounted to a pivot shaft 108, adjacent to the stack of discs 102.

The actuator assembly 104 has an actuator 116 and an arm assembly 118 that extends toward the stack of storage media 102. The arm assembly 118 includes a plurality of support arms 120 which support head assemblies 106 (however, only one arm 120 and head assembly 106 is viewable in the top-down view of FIG. 1). These head assemblies 106 each comprise a suspension member which supports an electromagnetic head 122, capable of reading and/or recording data on a respective disc surface. The heads are positioned in an array, adjacent various tracks along the respective disc surfaces in the stack, for reading and/or recording on such tracks.

The discs 102 are clamped onto the spindle hub 107 and are rotatable therewith by the drive action of a disc motor (not in view in FIG. 1). The disc motor preferably includes a rotor located within the housing interior and fixedly coupled to (or formed integrally with) the hub 107. Rotation of the rotor by the drive action of the motor effects a rotation of the hub 107 and the stack of discs 102. In preferred embodiments, the disc motor is a hydrodynamic motor. As described above, the disc motor components, such as the rotor of a hydrodynamic motor, can have a tendency of outgassing contaminants into the environment within the interior volume of the housing.

For example, in the above-described hardware environment, the oil used in the disc motor tends to vaporize within the housing interior and accumulate on other components, such as the heads and disc surfaces. Oils, such as dioctyl-sedacate motor oil used in hydrodynamic motors of the type referenced above, have been found to accumulate on heads and disc surfaces. Such accumulations are believed to be a major cause of head stiction. Accordingly, preferred embodiments of the present invention involve placing one or more articles within the interior of the disc drive housing, for absorbing and/or adsorbing airborne contaminants that are expected to form within the disc drive housing environment, before such contaminants can accumulate on the head and disc surfaces. In further preferred embodiments, the article is configured to be readily manufacturable and readily incorporated as part of a disc drive device with minimal manufacturing complexity.

Figure 2:
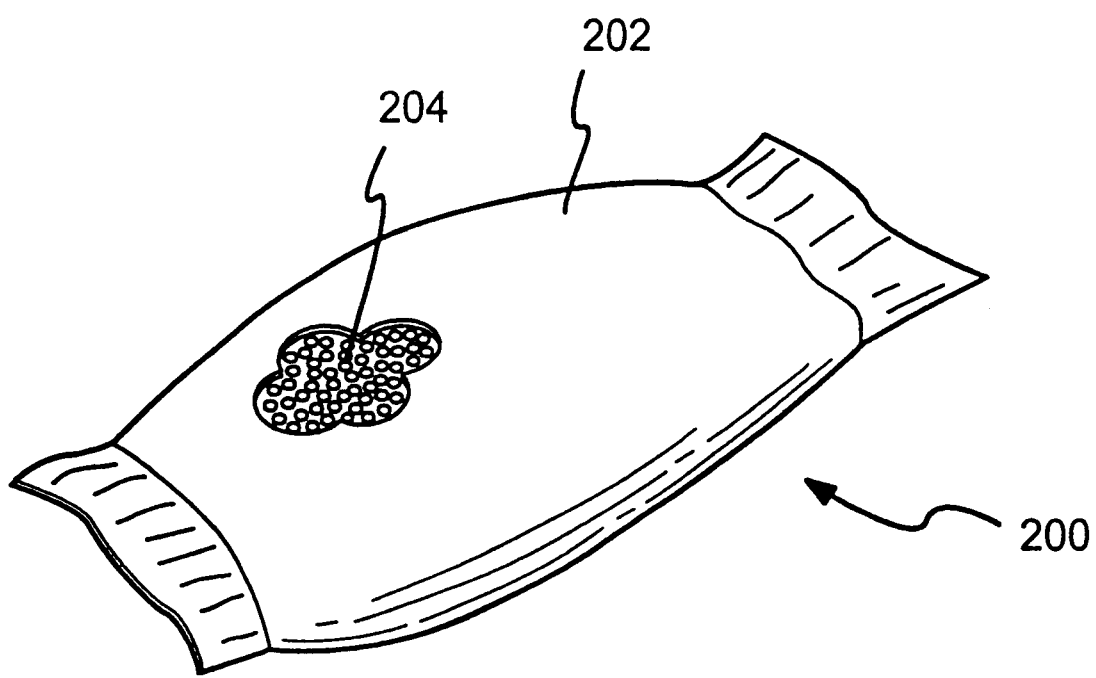
FIG. 2 illustrates an exemplary packet of absorbent or getter material employed with preferred embodiments of the present invention.

An embodiment of an article for reducing expected contaminants within the disc drive housing is shown in FIG. 2, as comprising a packet 200 composed of an outer material which forms a skin 202 containing a volume of suitable contaminant absorbing and/or absorbing material 204. The outer skin material is selected from materials which have suitable durability to contain the absorbing and/or adsorbing material for an extended period of time within a disc drive housing, and also be permeable or have sufficient pore dimensions to allow the passage of the expected gaseous contaminant therethrough to be absorbed or adsorbed by the material contained within the packet.

The material contained within the packet skin is a suitable material selected as an absorbent or getter for the expected contaminant. In preferred embodiments, the materials employed for the skin and absorbent and/or adsorbent are selected to process vaporized oil, for example, from the disc motor, as the expected contaminant. One preferred embodiment of the outer skin material 202 suitable for passing vaporized oil, comprises a polytetrafluoroethylene (PTFE) material, which may be stretched to increase pore dimensions, and improve the ability of the vaporized oil contaminant to pass therethrough. The use of PTFE material can be relatively inexpensive, readily available and relatively easy to use in manufacturing processes as described below.

As described above, one preferred embodiment of the material 204 contained within the skin is activated carbon. Activated carbon is effective in absorbing motor oil and is believed to have resulted in a reduction in the adverse effects of stiction. In preferred embodiments the material (preferably carbon) is selected (or "tuned") to have a pore size about equal to, or slightly greater, than the molecule size of the contaminant to be absorbed.

The volume of material 204 contained within the packet 200 is dependent, in part, on the dimensions of the disc drive interior and the expected amount of contaminant. In preferred embodiments, the volume is selected, based on the expected volume of contaminant that would otherwise be present in the disc drive housing over the normal operational life of the disc drive device. Thus, for example, on a disc drive system produced by Seagate Corporation (the assignee of the present invention) having general housing dimensions of approximately 10 cm. by 14.5 cm. by 1.5 cm., a volume of about 600 mg of activated carbon was employed in a single packet 200 disposed within the housing interior. However, other embodiments may employ other suitable volumes of material 204.

In preferred embodiments, the packet 200 is placed in a location within the housing interior having a relatively high exposure to air-flow within the interior. In further preferred embodiments, the packet location is configured or selected to be readily accessible, for example, a location exposed when the top wall of the housing is removed, as shown in FIG. 1. This allows the packet to be easily installed within the housing interior during manufacture.

In the embodiment of FIG. 1, the base portion of the housing 110 includes a receptacle 208 for receiving and holding the packet 200. The receptacle 208 comprises a section of the interior, at a housing corner adjacent the discs and head array. A location adjacent the discs is preferred, because airborne contaminants in that area are more likely to collect on the heads or disc surfaces and also because the motor rotor (from which contaminants outgass) is located in that vicinity. A location in the housing corner is preferred, in that such space is generally in air-flow communication with the disc and disc motor area of the housing and requires minimal modifications of typical housing designs. However, other embodiments may also or alternatively employ one or more packets 200 located at other suitable locations within the housing interior, in suitable proximity and air-flow communication with either the contamination source, the heads or both.

The receptacle 208 in FIG. 1 is defined by the interior-facing surfaces of the two side walls of the housing at the housing corner and an interior barrier 210 for inhibiting the packet 200 from moving out of the receptacle and contacting the discs. The receptacle is also bordered by the base and top walls. The interior barrier 210 is configured with vent passages 212, allowing air-flow communication between the receptacle 208 and the remainder of the housing interior.

The packet 200 may be formed by any suitable manufacturing process. In one preferred embodiment, the packet 200 is formed from a section of a tube of outer skin material 202, which is filled with material 204 and is crimped on both ends, as shown in FIG. 2. The tubes may be cut from a longer length of tubing and the crimped tube ends may be formed by, for example, a heat-crimping process.

Thus, a manufacturing process may first involve a determination of a suitable material 204 and a suitable volume of material 204 to absorb and or adsorb an expected contaminant within a given disc drive housing. Then a suitable length of PTFE tube is cut from a longer length of tubing. The cut tube is filled with the volume of material 204 and crimped on both ends, to define a packet 200. During assembly of the disc drive housing, the packet 200 is placed within the receptacle 208 at some time prior to the time at which the top wall is sealed over the base. Once the top wall is fixed in place over the base, the packet 200 is retained within the receptacle 208, in air-flow communication with the disc area of the housing interior.

In use, air flow and heat are generated during operation of the disc drive device. Airborne contaminants, such as vaporized motor oil, are therefore, carried by the airflow within the housing interior. Such airborne contaminants flow within the vicinity of the receptacle 208. By virtue of the vent openings in the barrier 210, airborne contaminates are allowed to flow from the disc area of the housing, into the receptacle 208, and in the vicinity of the packet 200 held within the receptacle. The airborne contaminants pass through the porous outer skin 202 of the packet 200 and become absorbed and/or adsorbed by the material 204 within the packet.

While preferred embodiments described above employ a sealed housing 210, wherein the interior of the housing is sealed against air-flow communication with the exterior of the housing, other embodiments may employ one or more vent openings, for example, in the top wall of the housing. Such a vent opening may comprise a single, relatively large breather hole (for example, a ¼ inch or 0.63 cm. diameter hole) in a central location of the top wall. Alternatively, such a vent opening may comprise a plurality of smaller holes (for example, a set of six ¹⁄₁₀ inch or 0.25 cm. diameter holes in a circular pattern) at a central location of the top wall. A filter element may be placed over the hole(s), to inhibit the passage of contaminants into the disk drive interior.

The vent opening functions to increase the air-exchange between the interior and exterior of the housing, which is believed to reduce the amount of certain types of contaminant vapor, such as oil vapor. In further preferred embodiments, a disc drive apparatus includes a vent opening arrangement and one or more packets 200 within the housing interior which, together, further minimize the amount of vaporized oil within the housing interior.

Accordingly, based on the foregoing description, various preferred embodiments of the present invention relate to a data storage system comprising a housing defining an interior environment, at least one data storage disc disposed within the housing interior, at least one head supported adjacent the data storage disc within the housing interior, a disc motor having a rotor disposed within the housing interior, the rotor having a capability of outgassing vaporized contaminant within the housing interior environment, a receptacle within the housing interior in air-flow communication with the disc motor rotor, and a packet containing contaminant absorbent and/or adsorbent material disposed within the receptacle. In further preferred embodiments, the packet comprises an outer skin composed of a porous material selected with pore dimensions suitable to allow passage of vaporized contaminant therethrough. In yet further preferred embodiments, the outer skin comprises polytetrafluoroethylene (PTFE). In yet further preferred embodiments, the packet contains activated carbon. The packet preferably comprises a tube having two ends and formed of porous material having pore dimensions suitable to allow passage of vaporized contaminant, the tube being sealed at both ends and defining an interior, wherein said contaminant absorbent and/or adsorbent material is contained within said tube interior.

Further preferred embodiments relate to a process of reducing airborne contamination in a data storage system comprising the steps of providing a housing having an interior environment containing at least one data storage disc, at least one head supported adjacent the data storage disc and a disc motor rotor; operating a disc motor to effect rotation of the rotor, resulting in vaporized contaminant being outgassed from the motor into the housing interior environment; disposing a packet containing contaminant absorbent and/or adsorbent material disposed within a receptacle in the housing interior in air-flow communication with the disc motor rotor; and absorbing and/or adsorbing vaporized contaminant outgassed from the rotor with said packet of contaminant absorbent and/or adsorbent material.

In preferred embodiments, said step of disposing a packet comprises selecting an outer skin composed of a porous material selected with pore dimensions suitable to allow passage of vaporized contaminant therethrough, forming the outer skin to define an internal pocket, and containing contaminant absorbent and/or adsorbent material within the internal pocket defined by the skin. In further preferred embodiments, said step of forming the outer skin to define an internal pocket comprises the steps of providing a tubing of said outer skin material; selecting a volume of containing contaminant absorbent and/or absorbent material suitable to process the vaporized contaminant; cutting a length of said tubing sufficient to contain said selected volume of contaminant absorbent and/or absorbent material; disposing said selected volume of contaminant absorbent and/or absorbent material within the cut length of tubing; and sealing both ends of said cut length of tubing, to enclose the contaminant absorbent and/or absorbent material therein.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive while maintaining substantially the same functionality without departing from the scope and spirit of the present invention.

What is claimed is:

1. A disc drive system comprising:
   a substantially rectangular housing defining a first interior chamber and a second interior chamber, the first interior chamber and the second interior chamber being separated by at least one interior wall, the interior wall defining a plurality of vent passages, the vent passages providing air-flow communication between the first and second interior chambers;
   at least one data storage disc disposed within the first interior chamber;
   at least one head supported adjacent the data storage disc within the first interior chamber;
   a hydrodynamic motor disposed within the first interior chamber and operatively connected to the at least one data storage disc for rotating the disc, the hydrodynamic motor containing a dicotyl-sedicate motor oil;
   a packet disposed within the second interior chamber, the packet containing absorbent material in an amount effective to absorb vaporized lubricant which may escape from the hydrodynamic motor throughout an anticipated life of the disc drive system, the packet comprising a substantially tubular outer skin substantially surrounding the absorbent material, the outer skin comprising polytetrafluoroethylene (PTFE), the absorbent material comprising activated carbon, wherein the outer skin of the packet includes a plurality of pores having a size suitable to allow passage of vaporized dioctyl-sedicate motor oil.

2. The disc drive system of claim 1 wherein the interior wall is positioned adjacent the at least one data storage disc, and wherein the interior wall includes two vent passages.

3. The disc drive system of claim 2 wherein the at least one data storage disc comprises a flat circular disc having an outer circumference and wherein the interior wall is positioned adjacent the at least one data storage disc substantially parallel with the outer circumference of the data storage disc.

* * * * *